United States Patent [19]

Sarrine

[11] Patent Number: 5,370,347
[45] Date of Patent: Dec. 6, 1994

[54] SUPPORT SYSTEM FOR AN EQUIPMENT HOUSING

[75] Inventor: Robert J. Sarrine, Beaumont, Tex.

[73] Assignee: Helena Laboratories Corporation, Beaumont, Tex.

[21] Appl. No.: 86,917

[22] Filed: Jul. 7, 1993

[51] Int. Cl.⁵ .................................... F16M 11/24
[52] U.S. Cl. .................................... 248/188.2
[58] Field of Search ............... 248/188.2, 188.3, 188.4, 248/188.1, 188.5; 312/351.7, 351.8

[56] References Cited

U.S. PATENT DOCUMENTS

| | | |
|---|---|---|
| 1,104,891 | 7/1914 | Heusser . |
| 2,375,872 | 5/1945 | Ress .................................... 248/188.2 |
| 3,491,977 | 1/1970 | Iller .................................... 248/188.4 |
| 3,750,989 | 8/1973 | Bergenson .................. 248/188.2 X |
| 3,954,241 | 5/1976 | Carlson ............................ 248/188.3 |
| 4,192,564 | 3/1980 | Losert ....................... 248/188.3 X |
| 4,801,114 | 1/1989 | Price .................................. 248/188.3 |
| 4,955,569 | 9/1990 | Hottmann ........................ 248/188.2 |
| 5,145,270 | 9/1992 | Darden ...................... 248/188.2 X |

FOREIGN PATENT DOCUMENTS

| | | |
|---|---|---|
| 2269890 | 9/1973 | France . |
| 210074 | 3/1924 | United Kingdom . |
| 390598 | 4/1933 | United Kingdom . |

Primary Examiner—Ramon O. Ramirez
Attorney, Agent, or Firm—Spencer, Frank & Schneider

[57] ABSTRACT

A support system for an equipment housing includes a pair of screw-adjustable legs at one end of the housing and a pivoting trestle at the other end. The pivoting trestle is made of two generally U-shaped channel members, one nested inside the other. The channel members have side walls, and a bolt extends through holes in the side walls to pivotally mount one channel with respect to the other. The housing can be levelled by adjusting the effective length of the two legs, and the trestle automatically pivots to accommodate these adjustments as they are made.

24 Claims, 2 Drawing Sheets

SUPPORT SYSTEM FOR AN EQUIPMENT HOUSING

BACKGROUND OF THE INVENTION

The present invention is directed to a system for supporting an equipment housing on a surface, and more particularly to a support system which can easily be adjusted to level the equipment housing.

Some equipment, such as medical diagnostic equipment, must be level in order to achieve optimum performance. Screw-adjustable legs are known for this purpose. Such legs are typically used at the four corners of the housing and their lengths are adjusted as necessary to make the housing level. Additional screw-adjustable legs may be used to provide further support if the equipment is particularly heavy.

Most people have experienced unstable tables or chairs which wobble because their legs are slightly different in length or because the legs rest on an uneven surface- The same problem is present in equipment housings. If an equipment housing has four or more screw-adjustable legs, the length of each leg must be adjusted precisely with respect to the rest so that each leg bears its share of the total weight and does not extend so far that it lifts other legs from the supporting surface.

A table or chair with three legs does not suffer from this instability problem. From a geometrical point of view, the table or chair is Supported at a fixed distance from each of three points defined by the feet of the legs, regardless of their length- An equipment housing could also be supported stably if three screw-adjustable legs were used. However, equipment housings are typically rectangular. If two legs were used adjacent one end and the third leg adjacent the other, the third leg would generally support approximately the same weight as the first two Legs together (assuming that the weight is uniformly distributed within the housing). This increased load on the third leg might damage the surface on which it rests. Furthermore, if the third leg is sufficiently rugged to bear its share of the weight, the first two legs would have to be unnecessarily rugged if they are selected to match the third leg and thus present the same visual appearance.

SUMMARY OF THE INVENTION

An object of the invention is to provide a system for supporting an equipment housing so that the equipment housing can be easily levelled.

Another object is to provide an easy-levelling support system without the disadvantage of using three adjustable-length legs.

These and other objects which will become apparent in the ensuing detailed description can be attained by providing an elongated member having a central portion, means for pivotally connecting the central portion of the elongated member to an equipment housing adjacent one end of the equipment housing so that the elongated member is generally horizontal, and a pair of adjustable-length legs mounted on the equipment housing adjacent its other end The elongated member preferably includes a first extruded metal channel member and the means for pivotally connecting preferably includes a second extruded metal channel member in which the first channel member is nested. The channel members have side panels which are pierced by holes, and an elongated element such as a bolt extends through the holes to pivotally connect the first channel member to the second channel member. The side panels of the first channel member are preferably machined to reduce their height except in the region of the holes; this increases the pivot angle that can be achieved.

DESCRIPTION OF THE PREFERRED EMBODIMENT

Figure 1:
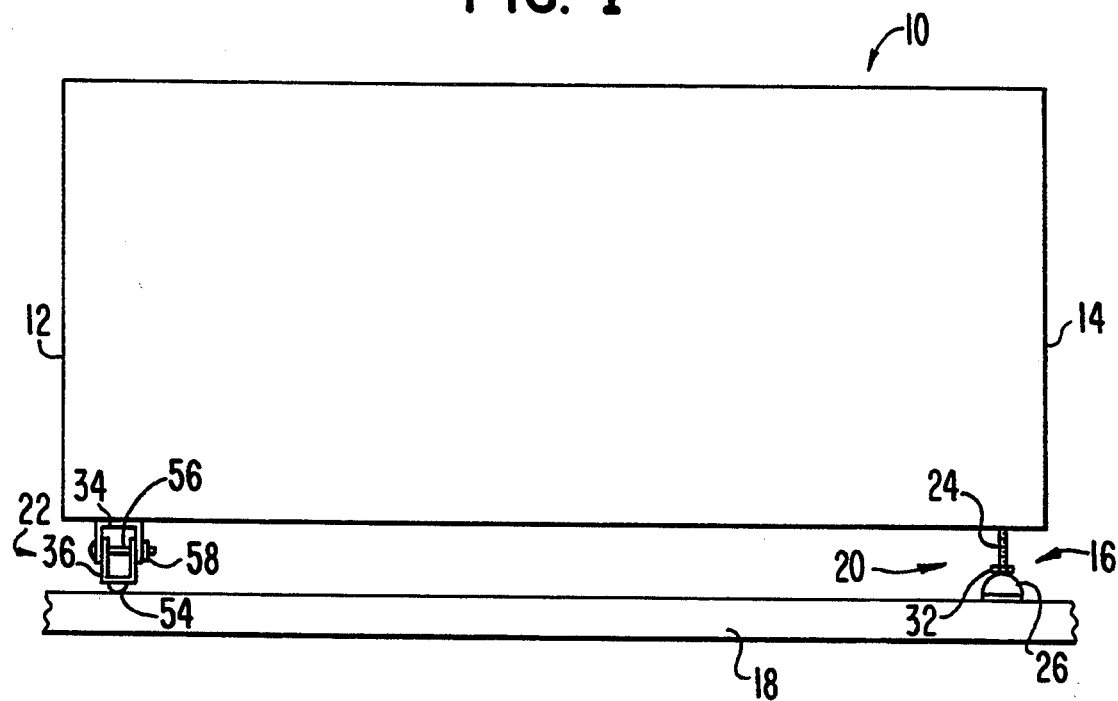
FIG. 1 is a front elevational view of an equipment housing having the easy-levelling support system of the present invention.

In the Figures, an equipment housing 10 has a left end 12 and a right end 14. The equipment mounted in the housing 10 may, for example, be medical diagnostic equipment, such as that disclosed in an application entitled "Automatic Electrophoresis Method and Apparatus," Ser. No. 08/079,378, filed by Robert J. Sarrine et al on Jun. 21st, 1993 and assigned to the assignee of the present application. The equipment disclosed in this application is heavy, weighing perhaps 60 kilograms. In order to avoid degrading the accuracy of the equipment when it is employed in diagnostic procedures, it is desirable for it to be level.

An easy-levelling support 16 for supporting housing 10 on a surface such as laboratory bench 18 includes a pair of screw-adjustable legs 20 at right end 14 and a pivoting trestle 22 at left end 12.

Screw-adjustable legs 20 are commercially available. Each leg 20 includes a threaded shaft 24 and a cup-like foot member 26 which is mounted at the lower end of shaft 24 so as to swivel with respect to shaft 24. A rubber pad 28 is attached to foot member 26 to protect the surface of bench 18 and to additionally keep housing 10 from sliding. A metal block 30 having a threaded bore (not illustrated) is affixed inside housing 10. Shaft 24 is screwed into the threaded bore. A nut 32 is affixed to shaft 24 adjacent foot member 26. It will be apparent that nut 32 can be gripped with a wrench (not illustrated) to rotate shaft 24 and thereby adjust the effective length of leg 20 beneath housing 10.

Pivoting trestle 22 includes a generally U-shaped channel member 34 and another generally U-shaped channel member 36, both of which are made from an extruded metal such as aluminum. Channel member 34 has a floor panel 38 and two side panels 40 and, similarly, channel member 36 has a floor panel 42 and two side panels 44. Channel segments for use in making channel members 34 and 36 are commercially available.

Figure 4:
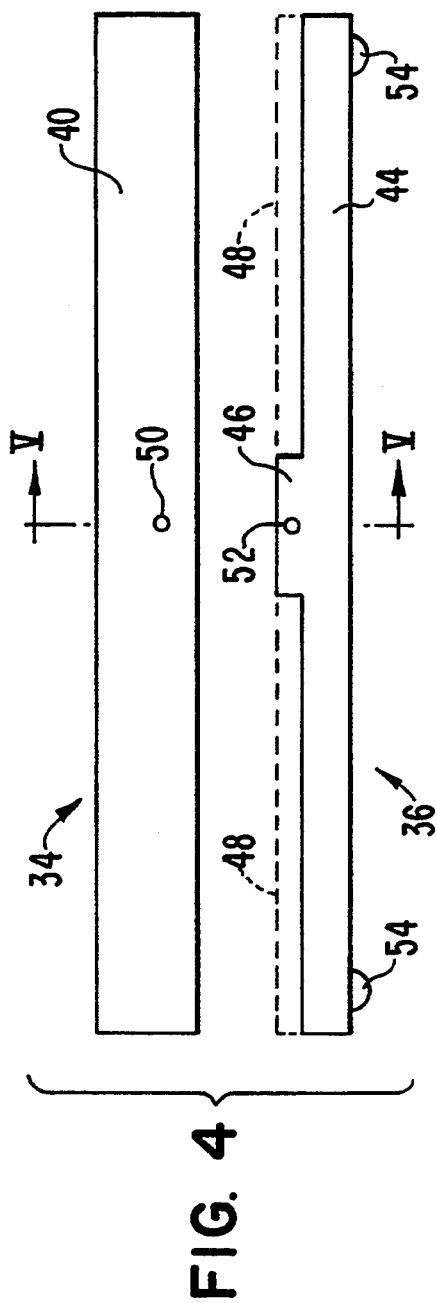
FIG. 4 is an exploded view illustrating the channel members of a pivoting trestle.

As is illustrated in FIG. 4, the side panels 44 of channel member 36 have a reduced height except at central portion 46. Dotted lines 48 illustrate portions of a commercially available channel segment that are cut away during fabrication of channel member 46.

Holes 50 are provided in channel member 34 and holes 52 are provided in side panels 44 of channel member 36 at central portion 46. Rubber pads 54 are adhesively attached to the outer side of floor panel 42.

Figure 2:
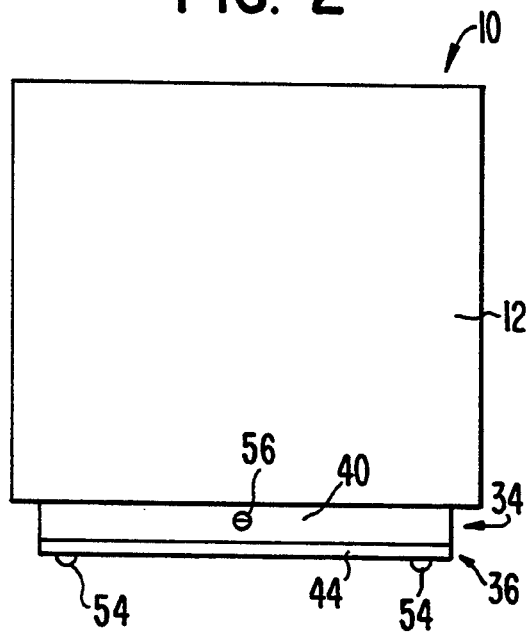
FIG. 2 is a left side view of the equipment housing and support system shown in FIG. 1.
Figure 3:
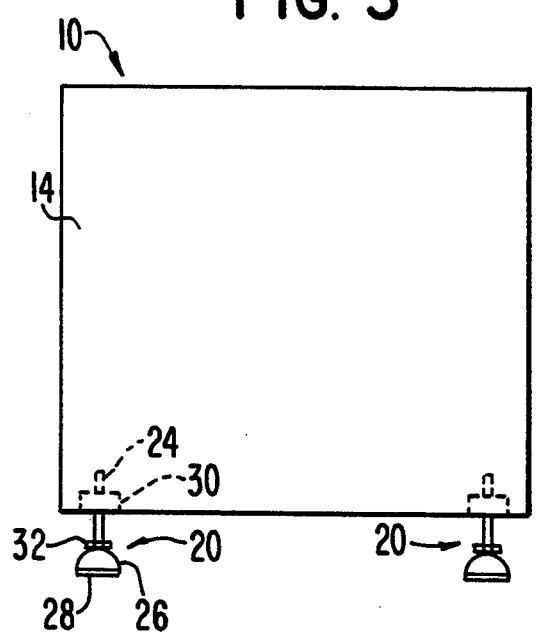
FIG. 3 is a right side view of the equipment housing and support system shown in FIG. 1.
Figure 5:
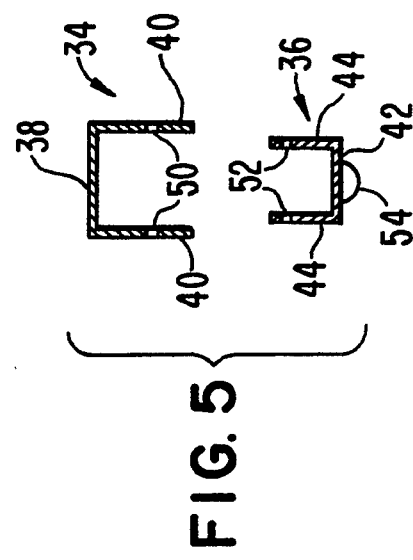
FIG. 5 is a sectional view taken along line V—V of FIG. 4.

As will be apparent from FIG. 5, the side panels 44 of channel member 36 are closer together than the side panels 40 of channel member 34. This permits channel member 36 to be nested inside channel member 34. In this nested position, a bolt 56 (see FIG. 2) having a threaded end region is inserted through holes 50 and 52 to pivotally mount channel member 36 with respect to channel member 34. A nut 58 is screwed onto the threaded region to secure bolt 56. Floor panel 38 of channel member 34 is screwed to the underside of housing 10.

Not only does channel member 34 serve as a mounting element for pivotally mounting channel member 36, it also increases the rigidity of housing 10. While it would be possible to nest a pair of channel members such that the smaller channel member is on top, in trestle 22 the larger channel member (that is, channel member 34) is on top as illustrated. This is more aesthetically appealing and furthermore avoids an upwardly open crevice between the channel members that would accumulate dust and debris.

To use support system 16, one first shortens screw-adjustable legs 20 to an initial height and places equipment housing 10 at a desired position in bench 18. If either the front side or the back side of housing 10 is too high, one of the legs 20 is lengthened as appropriate to bring the top side of housing 10 to a level condition in the fore-and-aft direction. As this occurs channel member 36 pivots about bolt 56 with respect to channel member 34 and thus housing 10. The cutaway portions identified by dotted lines 48 in FIG. 4 increase the degree of pivoting that is available. After housing 10 has been levelled fore-and-aft, it must be levelled left-to-right. This is accomplished by shortening or lengthening both legs 20 in unison as appropriate. After left-to-right levelling, the fore-and-aft levelling should be checked again and one of the legs 20 should be adjusted if necessary.

It will be apparent that support system 16 provides the stability of three-point support; if four legs (one at each corner) were used, housing 10 might teeter back and forth if one of the legs were slightly mis-adjusted. Providing two adjustable legs at one end permits housing 10 to be levelled in both the fore-and-aft direction and the left-to-right direction. While the primary advantages of three-point support could be achieved by positioning a third screw-adjustable leg 20 at the center of left end 12, pivoting trestle 22 is preferable since it increases the rigidity of housing 10 and avoids concentrating a major portion of the weight of the equipment in housing 10 at a single region on lab bench 18. The weight of the left half of the equipment in housing 10 is instead distributed to rubber elements 54 at separated spots on bench 18. Furthermore, trestle 22 is more attractive than a centrally disposed leg would be.

It will be understood that the above description of the present invention is susceptible to various modifications, changes, and adaptations, and the same are intended to be comprehended within the meaning and range of equivalents of the appended claims.

What is claimed is:

1. A support system for a housing having first and second ends, comprising:
   an elongated member having a central portion;
   means for pivotally connecting the central portion of the elongated member to the housing adjacent the second end thereof so that the elongated member is generally horizontal; and
   two adjustable-length legs mounted on the housing adjacent the first end thereof.

2. The support system of claim 1, wherein the adjustable-length legs are disposed along a line that is substantially parallel to the elongated member.

3. The support system of claim 1, wherein the adjustable-length legs are screw-adjustable legs.

4. The support system of claim 1, further comprising at least one pad on the elongated member to protect a surface on which the housing is supported by the support system.

5. The support system of claim 1, wherein the means for pivotally connecting has a pivot axis which passes between the adjustable-length legs.

6. A support system for a housing having first and second ends, comprising:
   an elongated member having a central portion;
   means for pivotally connecting the central portion of the elongated member to the housing adjacent the second end thereof so that the elongated member is generally horizontal; and
   two adjustable-length legs mounted on the housing adjacent the first end thereof,
   wherein the elongated member comprises a first extruded metal channel member having a floor panel and side panels which are connected to the floor panel.

7. The support system of claim 6, further comprising pads on the floor panel.

8. The support system of claim 6, wherein the side panels of the first channel member pass through the central portion of the first channel member, wherein the central portion of the first channel member has holes in its side panels, and wherein the means for pivotally connecting comprises a second extruded metal channel member having a floor panel and side panels which are connected to the floor panel of the second channel member, the second channel member having holes in its side panels and being connected to the housing, and an elongated element which extends through the holes in the side panels of the first channel member and the holes in the side panels of the second channel member.

9. The support system of claim 8, wherein the side panels of the first channel member are close together than the side panels of the second channel member, and the first channel member is nested within the second channel member.

10. The support system of claim 9, wherein the side panels of the first channel member have a reduced height except at the central portion of the first channel member.

11. The support system of claim 6, wherein the side panels of the first channel member pass through the central portion of the first channel member, wherein the central portion of the first channel member has holes in its side panels, and wherein the side panels of the first channel member are taller at the central portion of the first channel member than outside the central portion.

12. The support system of claim 6, wherein the adjustable-length legs are disposed along a line that is substantially parallel to the first channel member.

13. The support system of claim 12, wherein the adjustable-length legs are screw-adjustable legs.

14. The support system of claim 6, wherein the adjustable-length legs are screw-adjustable legs.

15. A support system for a housing having first and second ends, comprising:

an elongated member which extends in a direction of elongation, the elongated member having a central portion;

means for pivotally connecting the central portion of the elongated member to the housing adjacent the second end thereof so that the elongated member is generally horizontal and pivotal about a pivot axis which is transverse to the direction of elongation of the elongated member; and at least one adjustable-length leg mounted on the housing adjacent the first end thereof.

16. The support system of claim 15, wherein the pivot axis is generally horizontal and generally perpendicular to the direction of elongation of the elongated member.

17. The support system of claim 15, wherein the at least one adjustable-length leg mounted on the housing adjacent the first end thereof comprises a plurality of adjustable-length legs.

18. The support system of claim 17, wherein the adjustable-length legs are disposed along a line that is substantially parallel to the elongated member.

19. The support system of claim 15, wherein the elongated member comprises a first channel member having a floor panel and side panels which are connected to the floor panel.

20. The support system of claim 19, further comprising pads on the floor panel.

21. The support system of claim 19, wherein the side panels of the first channel member pass through the central portion of the first channel member, wherein the central portion of the first channel member has holes in its side panels, and wherein the means for pivotally connecting comprises a second channel member having a floor panel and side panels which are connected to the floor panel of the second channel member, the second channel member having holes in its side panels and being connected to the housing, and an elongated element which extends through the holes in the side panels of the first channel member and the holes in the side panels of the second channel member, the pivot axis passing through the elongated element.

22. The support system of claim 21, wherein the first and second channel members are made of extruded metal.

23. The support system of claim 21, wherein the side panels of the first channel member are closer together than the side panels of the second channel member, and the first channel member is nested within the second channel member.

24. The support system of claim 23, wherein the side panels of the first channel member have a reduced height except at the central portion.

* * * * *